Jan. 31, 1928.

J. VOLESKE

CABLE SHEARS

Filed Sept. 15, 1924

1,657,730

Inventor
John Voleske
Geisler & Ramsey
Attorneys

Patented Jan. 31, 1928.

1,657,730

UNITED STATES PATENT OFFICE.

JOHN VOLESKE, OF PORTLAND, OREGON.

CABLE SHEARS.

Application filed September 15, 1924. Serial No. 737,779.

My invention relates to portable shears which are especially adapted to cut cable, bar iron and similar sections of metal and are adapted to cut sections which are of substantial diameter. This type of portable tool is used extensively in logging and construction camps and yards, to repair cables and other parts of transmission machinery, and it is often necessary to carry the tools to the point of breakage. It is therefore necessary that the tool be as light as possible to facilitate the transporting of the tool from place to place and yet be of sufficient strength to shear the heaviest sections of bar iron and cables used.

A former patent of mine entitled Power cutter, granted November 7, 1916, and bearing Patent No. 1,204,090, covers shears of this character and the object of my present invention is to improve the shears so illustrated and described. Said improvements in my present device are directed toward making the device capable of shearing larger sections of metal without increasing the weight of the device substantially. The improvements in my present invention over the device illustrated and described in the patent mentioned are:

First, making the cutting blades of such shape that they will first define a closed aperture, and the continued closing of jaws gradually sever the article as compared with jaws which tend to cut through the cable substantially uniformly through its cross section. By the use of the jaws described in my present invention I am enabled to cut cable, approximately half again as large as I was able to shear with my former device.

Second, I provide a spring on the members adapted to hold the jaws open so that when the springing devices are slackened the jaws will open of their own accord rather than requiring the supporting device to be released and the members to be opened manually.

Third, I provide a release for the control and release for the latching means which tends to hold the spring mechanism in set position and thus permits this latch mechanism to be moved out of alinement so that the spring provided to open the jaws can counter-act the tendency of said operating mechanism to move the members towards each other.

Fourth, I arrange the opening between the jaw members at a substantial angle upwardly from the relatively fixed member and thus permit the member to be placed in position on the ground and a cable to be dropped into position between the jaws, as distinguished from the type of shears in which the jaws are substantially in alinement with the members, which require the cable to be slipped horizontally between the jaws, and which requires the operator to hold the cable manually in said jaws until they engage the article being cut.

I have hereinafter described these features in greater detail with reference to the accompanying drawings, in which.

Figure 1:
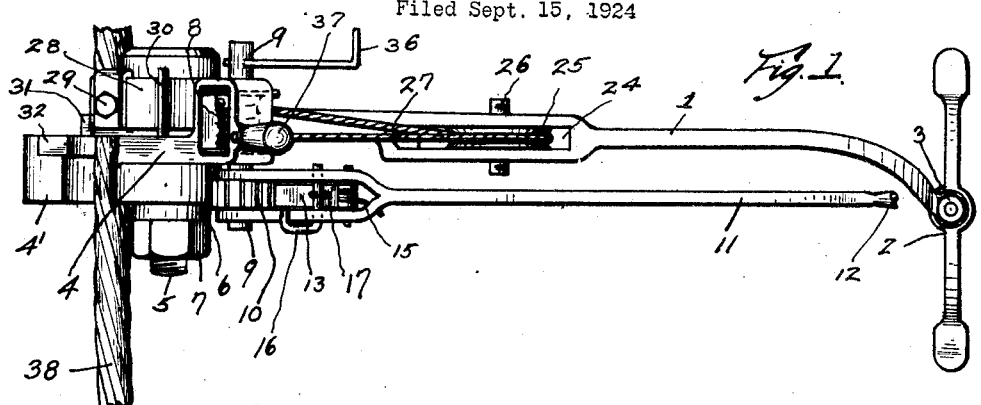
Fig. 1 is a plan view of the shears and shows a piece of cable inserted between the jaws.

My cable shears are made up of a relatively stationary cutting member 1 which is provided with a cutting jaw 1' at one end and with a base 2 at the other. Said base is adapted to support said member in upright position and is pivotally connected to said member by a bolt 3. The relatively movable cutting member 4 is provided with a hook-shaped cutting jaw 4' which co-operates with the cutting jaw 1' of the relatively fixed member 1. These cutting members are pivoted on a king pin 5 and are held against lateral movement thereon by the head thereof at one side and the washer 6 and the nut 7 at the other.

The relatively movable cutting member 4 is provided with a drum 8 which is rotatably mounted on a pin 9 which extends laterally thru said member 4. A ratchet 10 is mounted on said pin at one side of said cutting member 4 and controls the movement of said drum 8 at the other side. I provide an operating handle 11 for said ratchet which is bifurcated at one end 11ª and is fixed to the pin 9 astraddle of the ratchet 10. A convenient grip 12 is formed on the outer end of this handle and pawl 13 is pivotally mounted at the bifurcated portion 11ª upon the pin 14. Said pawl is adapted to engage the teeth in the ratchet 10 in one direction and is held in operative relation therewith by the coil spring 15, which is also mounted about pin 14 and one end of which engages the bifurcated portion 11ª of the operating handle 11. The other end of said spring engages the pawl 13 to hold it in operative position.

I provide a member 16 arranged transversely to the bifurcated portion 11ª which carries the pin 17, said pin is normally arranged to lie substantially parallel with the pawl 13. In this position said pin permits the pawl to engage the ratchet 10 to cause the drum to be rotated by the movement of the operating lever 11. When said pin 17 is arranged normally or at right angles to the pawl it lifts said pawl out of engagement with said ratchet. I also provide a control or locking pawl 18 which is pivotally mounted upon a pin 19 extending laterally from said movable cutting member 4. The end 18ª of this locking pawl is adapted normally to engage the teeth of the ratchet 10 to hold the ratchet, and thus the drum, in set position. The pawl is normally held in engaging position with the ratchet by a spring 20, which is carried by the pawl 18 and bears against the pin 21 also extending laterally from the rotatable member 4.

I provide a cam-shaped control member 22 for said locking pawl 18 which member is pivotally mounted on a pin 23 also extending laterally from said relatively movable member 4. This cam-shaped member normally permits the spring 20 to hold the pawl in engagement with the teeth of the ratchet 10, but when it is desired to release said ratchet, the cam 22 is rotated clockwise, as viewed in Fig. 2, to bring the portion of said cam-shaped member further away from the pin 23, into engagement with the end of the pawl. This rocks the pawl 18 anti-clockwise about its pivot 19 and thus lifts the point 18ª out of engagement with the ratchet 10. I provide the relatively fixed cutting member 1 with an elongated slot 24 in which the sheave 25 is mounted. Said sheave is rotatably mounted upon a pin 26 extending through said slotted portion. I mount the operating cable 27 over said sheave and said drum 8 and fasten one of the ends to the drum 8, and the other to the member 4 adjacent the drum, as shown at 27ª in Fig. 2. This forms a loop between said ends and this loop passes over the sheave 25. When the drum 8 is rotated to take up this loop it will tend to draw the members 1 and 4 together, enclose the jaw members 1' and 4'.

I provide a laminated spring 28 upon the fixed jaw 1', said laminated portion being held to the relatively fixed cutting member by a bolt 29. This spring extends outwardly from said member 1 and engages a pin 30 extending laterally from said relatively fixed member 4, said spring is so arranged that it tends to spread said jaw members 1' and 4' apart to provide an aperture for the article being cut. I preferably provide removable blades 31 and 32 in the jaws held in position by bolts 33 and 34 respectively. By the provision of removable blades I am permitted to use carbon steel for said blades and other metals for the remaining portions.

The blade 31 which is mounted upon the jaw 4' is preferably hook-shaped, the hooked portion lying closer to the pivot than the straight portion which constitutes the free end thereof. Said hooked portion is curved along substantially the same arc as the maximum diameter of the articles to be cut. Thus if said shears is of such size that they are capable of cutting one inch cable the curvature of said hook portion in said blade will lie along the segment of a circle 1 inch in diameter. The blade 32 carried by the jaw 1' is also preferably curved but in the opposite direction and along a much greater arc of curvature. Thus if the jaws are brought together the cutting blades will first overlie each other at their points so as to form an aperture 35 between the blades for holding the article being cut, against displacement from said jaws and the gradual closing of said aperture severing the article being cut. This results in the cable or other article being cut, being held in position firmly while the jaws are closed and causes a smooth shearing cut rather than abrupt chop. The shearing of the article in this manner not only permits the shears to cut articles of greater diameter than otherwise, but also causes the severance to be made clean and with less burr on the portions cut. As can be noted in Fig. 2 the opening between the jaws is arranged upwardly at a substantial angle which permits the cable or other article being cut, to be placed in position between the jaws where it will lie at the bottom thereof due to its own weight. This I consider important especially in case the article being sheared is cable, because it is usually connected between two points and is relatively taut. With my device it is necessary merely to place the shears adjacent the cable and then lift the same up and move it over until it is in alinement with the opening, and then drop the same into the shears. The tension of the cable does not tend to lift the cable upwardly and thus the cable tends to remain between the jaws. If, on the other hand, shears are used in which the jaws open in alinement with the members, it is necessary that the cable not only be moved over to the shears but also be held in that position until the jaws have gripped the same firmly enough so that it will not tend to slip out therefrom.

For convenience I also preferably provide a removable handle 36 in the pin 9 upon which the drum 8 is fastened so as to permit the slack to be taken out of operating cable 27 quickly. I also provide a handle 37 upon the end of the relatively movable cutting member 4 so that the jaws can be moved together about the cable quickly and the handle 36 may be used to remove the slack thus caused. If articles of relatively small diameter are cut the handle 37 may be used to cause this severance, independently of the cable connected drum.

Figure 2:
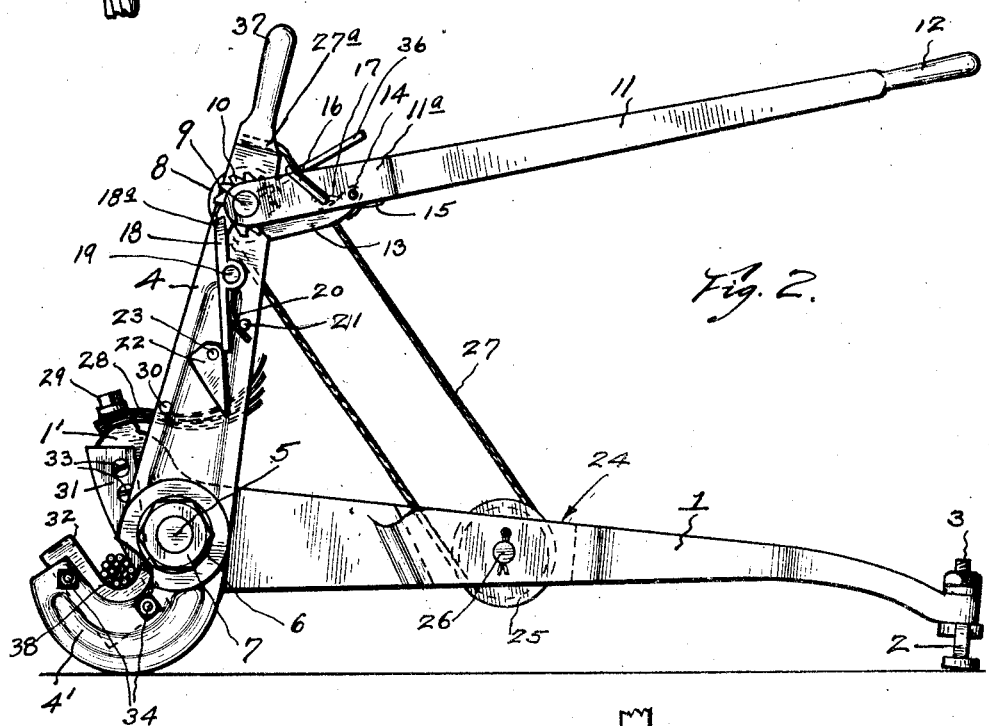
Fig. 2 is a side elevation of the shears with a cable inserted between the opened jaws.
Figure 3:
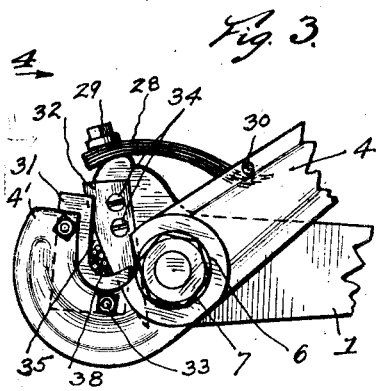
Fig. 3 is a fragmentary elevation of the jaws partly closed.
Figure 4:
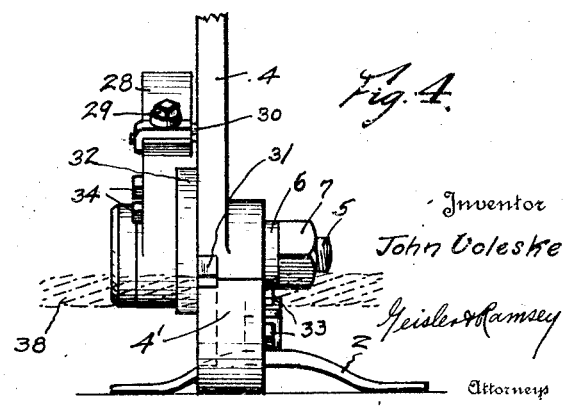
Fig. 4 is an elevation of the jaws of my device, taken in the direction of the arrow 4 in Fig. 3.

The operation of my device is as follows:

The jaw portions of the shears normally are arranged in open position and thus to cut the cable 38 or other article, the same is merely lowered to position between the members as shown in Fig. 2. The weight of said articles tends to cause it to remove to the bottom of the aperture 35 between the cutting blades. The members 1 and 4 are then closed manually until the blades meet the article at each side. This operation is performed by gripping the handle 37 and moving the same towards the member 1. The slack in the cable 27 thus caused is taken up by the handle 36. The pawls 18 and 13 are permitted to engage the ratchet 10 and the operating lever 12 is then reciprocated to cause the drum 8 to take up the cable 27. This causes the degree of angularity between the members 1 and 4 to decrease and the closing of said jaw portion thus severs the material. To release the jaws the pawl 13 is first lifted from position by the member 16 which carries the pin 17 and the pawl 18 is lifted from engaging position by moving the cam-shaped control member 22 into its engaging position with said pawl. This releases the ratchet 10 and permits the spring 22 to open said jaws to their normal position in which position the cable is arranged to receive another section of material to be cut.

I claim:

1. Cable shears comprising two levers pivoted together at one end, one of said levers provided with a U-shaped recess beyond said pivot, said recess carrying a shearing-blade on that side farthest from the pivot, the other member provided with an angular projection carrying a shearing blade arranged to shear across and finally to close said recess, when said levers are brought together, the lever last referred to provided at its free end with a supporting base.

2. Cable shears comprising two levers pivoted together at one end, one of said levers provided with a U-shaped recess beyond said pivot, said recess carrying a shearing-blade on that side farthest from the pivot, the other member provided with an angular projection carrying a shearing blade arranged to shear across and finally to close said recess, when said levers are brought together, the lever last referred to provided at its free end with a supporting base, and means for applying a mechanical power to said levers to force the same together by rotation on their pivot.

3. Cable shears comprising two levers pivoted together at one end, one of said levers provided with a U-shaped recess beyond said pivot, said recess carrying a shearing-blade on that side farthest from the pivot, the other member provided with an angular projection carrying a shearing-blade arranged to shear across and finally to close said recess when said levers are brought together, the lever last referred to provided at its free end with a supporting base, means for applying a mechanical power to said levers to force the same together by rotation on their pivot, and a spring-element normally positioning the lever provided with said angular projection so that the shearing-blade carried thereby clears said recess.

4. Cable shears comprising two levers pivoted together at one end, one of said levers provided with a U-shaped recess beyond said pivot, said recess carrying a removable shearing-blade on that side farthest from the pivot, the other member provided with an angular projection carrying a removable shearing-blade arranged to shear across and finally to close said recess, when said levers are brought together, the lever last referred to provided at its free end with a supporting base, and means for applying a mechanical power to said levers to force the same together by rotation on their pivot.

5. Cable shears comprising two levers pivoted together at one end, one of said levers provided with a U-shaped recess beyond said pivot, said recess carrying a removable shearing blade on that side farthest from the pivot, the other member provided with an angular projection carrying a removable shearing-blade arranged across and finally to close said recess, when said levers are brought together, the lever last referred to provided at its free end with a supporting base, means for applying a mechanical power to said levers to force the same together by rotation on their pivot, and a spring-element normally positioning the lever provided with said angular projection so that the shearing-blade carried thereby clears said recess.

6. Cable shears comprising two levers pivoted together at one end, one of said levers provided with a U-shaped recess beyond said pivot, said recess carrying a shearing-blade on that side farthest from the pivot, the other member provided with an angular projection carrying a shearing-blade arranged to shear across and finally to close said recess when said levers are brought together, the lever last referred to provided at its free end with a supporting base, and a spring-element normally positioning the lever provided with said angular projection so that the shearing-blade carried thereby clears said recess.

JOHN VOLESKE.